(12) United States Patent
Pang et al.

(10) Patent No.: US 10,611,644 B2
(45) Date of Patent: Apr. 7, 2020

(54) EQUIPMENT AND PROCESS FOR PREPARING SILICON OXIDES

(71) Applicant: Shenzhen BTR New Energy Materials Inc., Guangdong (CN)

(72) Inventors: Chunlei Pang, Guangdong (CN); Jianguo Ren, Guangdong (CN); Min Yue, Guangdong (CN)

(73) Assignee: BTR New Material Group Co., Ltd., Shenzhen, Guangdong (CN)

( * ) Notice: Subject to any disclaimer, the term of this patent is extended or adjusted under 35 U.S.C. 154(b) by 84 days.

(21) Appl. No.: 15/516,363

(22) PCT Filed: Jul. 8, 2015

(86) PCT No.: PCT/CN2015/083616
§ 371 (c)(1),
(2) Date: Mar. 31, 2017

(87) PCT Pub. No.: WO2017/004818
PCT Pub. Date: Jan. 12, 2017

(65) Prior Publication Data
US 2017/0297917 A1    Oct. 19, 2017

(51) Int. Cl.
*C01B 33/18* (2006.01)
*B01J 19/00* (2006.01)
(Continued)

(52) U.S. Cl.
CPC ......... *C01B 33/182* (2013.01); *B01J 19/0013* (2013.01); *B01J 19/0053* (2013.01);
(Continued)

(58) Field of Classification Search
CPC . C01B 33/182; B01J 19/0013; B01J 19/0053; F27B 13/04; F27B 13/06
See application file for complete search history.

(56) References Cited

U.S. PATENT DOCUMENTS

| 2004/0166046 | A1 | 8/2004 | Fukuoka |
| 2004/0241075 | A1 | 12/2004 | Nishioka |
| 2014/0113192 | A1 | 4/2014 | Fukuoka et al. |

FOREIGN PATENT DOCUMENTS

| CN | 2451567 Y | 10/2001 |
| CN | 1989639 A | 6/2007 |

(Continued)

OTHER PUBLICATIONS

CN 2451567 machine translation.*
(Continued)

*Primary Examiner* — James A Fiorito
(74) *Attorney, Agent, or Firm* — Sandberg Phoenix & von Gontard, P.C.

(57) ABSTRACT

The present invention discloses an equipment and process for preparing silicon oxides, and relates to the field of chemical equipments. Said equipment comprises at least one tank having opening(s) at at least one end thereof and comprising a reaction unit and a collection unit, wherein the reaction unit is used for placing raw materials therein; and the collection unit is used for placing a collector therein which is placed at the opening end of the tank; and the reaction unit is placed away from the opening end of the tank and placed inside a heating furnace; the collection unit and opening(s) are both placed outside the heating furnace; the tank is vacuumized via a port; and a tank lid is used for opening or closing the opening(s) of the tank. The preparation process uses such equipment. The present invention solves the problems of great energy consumption and low efficiency caused by the fact that the previous equipment and process for preparing silicon oxides are unable to achieve continuous production.

9 Claims, 1 Drawing Sheet

(51) Int. Cl.
  *F27B 13/04* (2006.01)
  *F27B 13/06* (2006.01)
  *H01M 4/485* (2010.01)
  *H01M 4/38* (2006.01)

(52) U.S. Cl.
  CPC .............. *F27B 13/04* (2013.01); *F27B 13/06* (2013.01); *H01M 4/386* (2013.01); *H01M 4/485* (2013.01)

(56) References Cited

FOREIGN PATENT DOCUMENTS

| | | | |
|---|---|---|---|
| CN | 204162438 U | 2/2015 | |
| CN | 204973821 U | 1/2016 | |
| EP | 1236682 B1 | 1/2006 | |
| JP | 2014086254 | 5/2014 | |
| WO | WO 2003025246 * | 2/2002 | ............. C23C 14/24 |
| WO | 03025246 | 3/2003 | |

OTHER PUBLICATIONS

International Search Report from the corresponding PCT/CN2015/083616 dated Apr. 19, 2016.
Written Opinion from the corresponding PCT/CN2015/083616 dated Apr. 19, 2016.

* cited by examiner

EQUIPMENT AND PROCESS FOR PREPARING SILICON OXIDES

CROSS-REFERENCE TO RELATED APPLICATIONS

This application is the US National Stage of International Application PCT/CN2015/083616 which was filed Jul. 8, 2015, and published as WO2017/004818 and which is hereby incorporated by reference.

TECHNICAL FIELD

The present invention relates to the field of chemical equipment, especially to equipment and a process for preparing silicon oxides.

BACKGROUND

SiO is an important raw material for preparing optical glass, semiconductor materials and anode materials for lithium-ion batteries.

Due to rigorous production conditions, the yield of SiO cannot meet the market requirements. The current production manners generally involve reacting Si with $SiO_2$ under vacuum and high temperature to produce SiO gas, and making SiO coagulate at cryogenic temperatures.

The current industrial equipment for producing SiO involves placing the reaction chamber and collection chamber inside a vacuum cylinder, and inserting a heating wire into the cavity between the reaction chamber and the vacuum cylinder. However, such equipment cannot effectively increase the size of the reaction chamber, and thus results in a low product yield, as well as a worse uniformity of the material composition in all directions of the product. Since the heating device is placed inside the vacuum cylinder, it cannot be heated by combustion, rendering a great energy consumption; since the reaction chamber and collection chamber both are placed inside the vacuum cylinder, the whole equipment needs to be cooled to take out SiO in the collection chamber, so that a continuous production cannot be realized, resulting in a great waste of energy.

SUMMARY

One object is to provide equipment for preparing silicon oxides, to realize semi-continuous production and reduce energy consumption.

In order to achieve such object, we disclose the following technical solution.

Equipment for preparing silicon oxides comprises at least one tank having opening(s) at at least one end thereof and comprising a reaction unit and a collection unit, wherein the reaction unit is used for placing raw materials therein, and the collection unit is used for placing a collector therein which is placed at the opening end(s) of the tank; the reaction unit is placed away from the opening end(s) of the tank and placed inside a heating furnace; the collection unit and opening(s) are both placed outside the heating furnace; the tank is subjected to a vacuum via a port; and a tank lid is used for opening or closing the opening(s) of the tank.

Furthermore, the collection unit is equipped with a cooling device.

Furthermore, the heating furnace is connected with air.

Furthermore, the heating furnace is heated electrically or by combustion.

Furthermore, the collector is a tubular structure having opening(s) at at least one end.

Furthermore, the collector has a taper, and the small end of the collector is directed to the tank lid.

Furthermore, the port is located in the collection unit.

Furthermore, the cooling device comprises a cooling jacket sleeved on the collection unit, and is used for circulation cooling via cooling media.

Furthermore, the axis of the reaction unit is horizontal.

Another object lies in providing a process for preparing silicon oxides, which increases production efficiency and reduces energy consumption.

A process for preparing silicon oxides by using the equipment comprises the following steps:

step 1, turning on the heating furnace;
step 2, turning on the cooling device;
step 3, opening the tank lid, mixing Si powder and $SiO_2$ powder as raw materials and placing them into the reaction unit, placing the collector into the collection unit, and sealing the tank lid;
step 4, subjecting the tank to a vacuum via the port;
step 5, continuing to run the heating furnace and the cooling device after the completion of the reaction of the raw materials in the tank, opening the tank lid, taking out the collector, placing new raw materials into the reaction unit, placing a new collector into the collection unit, sealing the tank lid, subjecting the tank to a vacuum via the port, starting a next reaction, and peeling off the silicon oxide product from the collector taken out; and
step 6, repeating step 5 until the end of the preparation.

Furthermore, the tank has a loading capacity of 2-200 KG; the heating furnace has a temperature of 1100-1400° C.; the tank has a vacuum extent of 0.1-10000 Pa; the cooling device has a temperature of 100-800° C.; and the period between placing a new collector in step 5 and taking out the collector in step 6 is from 2-60 h.

The present method and equipment have the following beneficial effects.

Equipment for preparing silicon oxides is disclosed, wherein the reaction unit is placed inside the heating furnace; the collection unit and opening(s) are placed outside the heating furnace; the opening(s) is/are opened to take out the collector; a new collector is placed and then the opening(s) is/are closed. There is no need to cool the whole equipment, and the heating furnace can continuously run and has a high efficiency. The previous equipment needed to be cooled, and the increasing and decreasing of the temperature resulted in energy waste. The disclosed equipment saves energy to a large extent. Meanwhile, the preparation process by using the aforesaid preparation equipment increases preparation efficiency and reduces energy consumption.

1. Tank; 2. Opening(s); 3. Reaction unit; 4. Collection unit; 5. Raw materials; 6. Collector; 7. Heating furnace; 8. Port; 9. Tank lid; 10. Cooling device; 11. Cooling jacket; 12. Product.

DETAILED DESCRIPTION

The technical solution of the equipment and process is further explained by the specific embodiments in combination with the drawings.

Example 1

Figure 1:
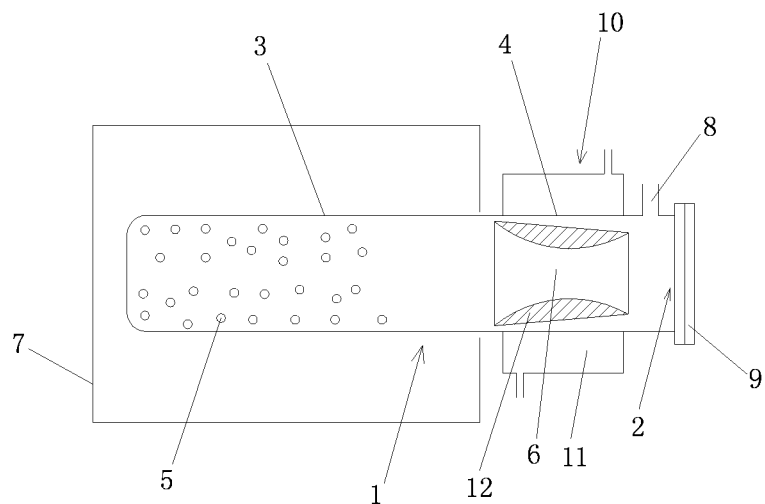
FIG. 1 shows a structural diagram of the equipment for preparing silicon oxides provided in Example 1.

As shown in FIG. 1, equipment for preparing silicon oxides comprises one tank 1 having an opening 2 at one end thereof and comprising a reaction unit 3 and a collection unit 4, wherein the reaction unit 3 is used for placing raw materials 5 therein; and the collection unit 4 is used for placing a collector 6 therein which is placed at the opening end of the tank 1; the reaction unit 3 is placed away from the opening end of the tank 1 and is placed inside a heating furnace 7; the collection unit 4 and opening 2 are both placed outside the heating furnace 7; the tank 1 is subject to a vacuum via a port 8; and a tank lid 9 is used for opening or closing the opening 2 of the tank 1.

During the reaction, the tank 1 was exhausted via the port 8, so as to make the tank 1 meet the vacuum requirements. The raw materials 5 inside the reaction unit 3 were heated by the heating furnace 7, to produce product vapor by chemical reaction. Since the collection unit 4 is located outside the heating furnace 7, the air temperature around the collection unit 4 is far lower than the temperature of the heating furnace 7, the heat exchange between the product vapor and air outside the tank 1 took place, and the product vapor was condensed on the collector 6 to form solid product 12. After one production period, the tank lid 9 was opened to take out the collector 6 from the opening 2. New raw materials were fed into the reaction unit, and a new collector was placed in the collection unit. The tank lid 9 was closed to repeat the aforesaid process until the completion of the production. During such process, the heating furnace 7 was operated without being shutdown and the production status was kept, so as to achieve semi-continuous production and to extremely increase efficiency and save energy.

In order to ensure a better sealing state of the tank 1 in this example, an opening 2 was only set at one end of the tank 1. As required, those skilled in the art can set openings at both ends of the tank 1, which were both sealed with tank lids.

The collection unit 4 of this example could be cooled by air or a cooling device, and the cooling mode was chosen as required. In order to cool the collection unit 4 faster, a cooling device 10 was set on the collection unit 4.

The heating furnace 7 was connected with air, so as to achieve heating electrically or by combustion. Electrical heating includes high-frequency induction heating, microwave heating, and resistance heating which includes silicon carbide rod, silicon molybdenum rod, and graphite resistance heating. Fuels used for combustion heating include natural gas, coal gas, gas, biomass gas or artificial gas. As compared to electrical heating, combustion heating saves energy to a large extent. Due to the vacuum state inside the tank 1, the atmospheric pressure is disadvantageous to the service life of the tank 1. In order to ensure the service life of the tank 1, the tank 1 in this example was made of one or more materials selected from the group consisting of heat resistant steel, ceramics, corundum, silicon carbide and carbon materials; heat resistant steel is preferred in order to ensure leak-proofness, workability and processing cost. Moreover, the tank 1 preferably has a diameter of 100 mm-1000 mm, and preferably has a length of 300 mm-500 mm.

The collector 6 is a tubular structure having opening(s) at at least one end for collecting and picking.

In this example, the collector 6 has a taper, and the small end of the collector 6 is directed toward the tank lid 9 for taking the collector out and putting it in.

The port 8 is located in the collection unit 4 for ensuring the vacuum degree inside the tank 1.

In this example, the cooling device 10 comprises a cooling jacket 11 sleeved on the collection unit 4, and is used for circulation cooling via cooling media selected from the group consisting of water, air, inert gas, cooling liquid and the like. In this example circulating water was used for cooling, which has a low cost.

In this example, the cooling jacket 11 is located inside or outside the collection unit 4.

The collector 6 is made of one or more materials selected from the group consisting of heat resistant steel, SUS, iron sheet, quartz, graphite, tungsten sheet, silicon carbide, alumina and C/C composite materials.

The process for preparing silicon oxides by using the equipment in this example comprises the following steps:

step 1, turning on the heating furnace 7;

step 2, turning on the cooling device 10;

step 3, opening the tank lid 9, mixing Si powder and $SiO_2$ powder as raw materials 5 and placing them into the reaction unit 3, placing the collector 6 into the collection unit 4, and sealing the tank lid 9;

step 4, subjecting the tank 1 to a vacuum via the port 8;

step 5, continuing to run the heating furnace 7 and the cooling device 10 after the completion of the reaction of the raw materials 5 in the tank 1, opening the tank lid 9, taking out the collector 6, placing new raw materials into the reaction unit 3, placing a new collector into the collection unit 4, sealing the tank lid 9, subjecting the tank 1 to a vacuum via the port 8, starting a next reaction, and peeling off the silicon oxide product 12 from the collector 6 taken out of the collection unit; and step 6, repeating step 5 until the end of the preparation.

Such a process does not require that the furnace be shut down during the preparation. Steps 5 and 6 achieve semi-continuous operation of the equipment, so as to greatly increase production efficiency and to avoid energy waste which otherwise occurs during the temperature increasing and decreasing of the heating furnace 7.

In order to achieve higher production efficiency and lower cost, the tank 1 has a loading capacity of 2-200 KG; the heating furnace 7 has a temperature of 1100-1400° C.; the tank 1 has a vacuum degree of 0.1-10000 Pa; the cooling device 10 has a temperature of 100-800° C.; and the period between placing a new collector in step 5 and taking out the collector 6 in step 6 is from 2-60 h.

Example 2

Figure 2:
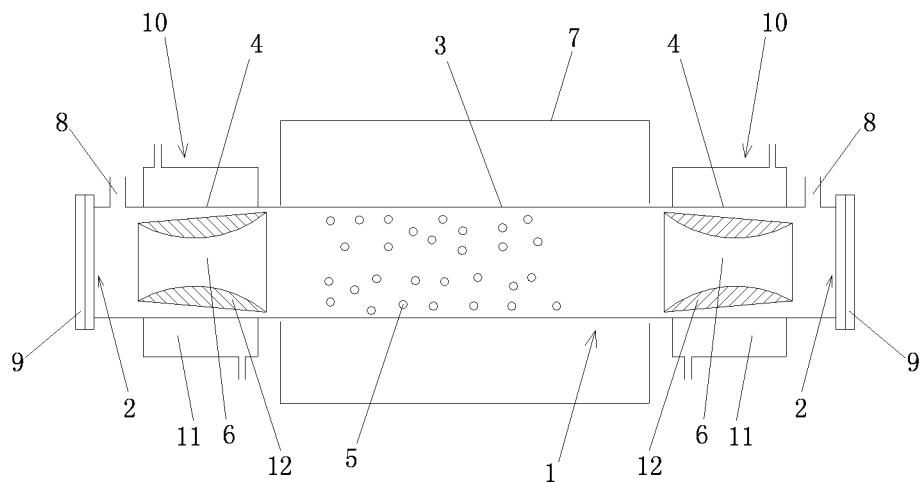
FIG. 2 shows a structural diagram of the equipment for preparing silicon oxides provided in Example 2.

As shown in FIG. 2, this example is different from Example 1 in that there were openings 2 at both ends of the tank 1, which were sealed via the tank lids 9. The collectors 6 and cooling devices 10 were set in the same way as those in Example 1. In this example, the reaction unit 3 was set inside the heating furnace 7; the collection units 4 at both ends of the reaction unit 3 were set outside the heating furnace 7. On the premise of ensuring a better sealing, this example further increases the preparation rate and production efficiency of the product.

Example 3

Figure 3:
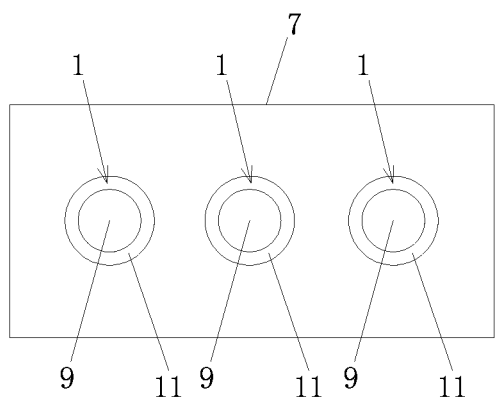
FIG. 3 shows a structural diagram of the equipment for preparing silicon oxides provided in Example 3.

As shown in FIG. 3, this example is different from Example 1 in that there were three tanks 1. According to production requirements and the size of the heating furnace 7, those skilled in the art can reasonably set the number of the tanks 1 which is not limited by this Example. More tanks 1 set in this example utilize the heat of the heating furnace 7 in a better way.

The aforesaid examples are only examples for clearly explaining the present invention, rather than limits to the embodiments of the present invention. Those ordinarily skilled in the art can make other changes or variations in different forms on the basis of the aforesaid examples. Moreover, there is no need here to exhaustively illustrate all the embodiments. Any other changes, equivalent replacements and modifications within the scope of the spirit and principle of the present invention will be comprised within the protection scope of the present invention.

The invention claimed is:

1. Equipment for preparing silicon oxides comprises at least one tank having an opening at at least one end thereof and defining a reaction unit and a collection unit, and a collector removably received in said collection unit proximate the opening; the collection unit being equipped with a cooling device sleeved on the collection unit and being sized such that the cooling device cools only the collection unit; wherein the reaction unit is used for placing raw materials therein; the collector being placed at the opening of the tank; the equipment further including a heating furnace which receives the reaction unit of the at least one tank; the at least one tank being sized relative to the heating furnace such that the collection unit, cooling device, and opening are all outside the heating furnace, whereby the heating furnace heats only the reaction unit; the tank comprising a port to place the tank in communication with to a vacuum; and a tank lid is used for opening or closing the opening of the tank.

2. The equipment for preparing silicon oxides as claimed in claim 1, wherein the heating furnace is connected with air.

3. The equipment for preparing silicon oxides as claimed in claim 2, wherein the heating furnace is heated electrically or by combustion.

4. The equipment for preparing silicon oxides as claimed in claim 1, wherein the collector is a tubular structure having an opening at at least one end.

5. The equipment for preparing silicon oxides as claimed in claim 4, wherein the collector has a taper and defines a small end, and the small end of the collector is directed toward the tank lid.

6. The equipment for preparing silicon oxides as claimed in claim 1, wherein the port is located in the collection unit.

7. The equipment for preparing silicon oxides as claimed in claim 1, wherein the cooling device comprises a cooling jacket sleeved on the collection unit, and is used for circulation cooling via cooling media.

8. A process for preparing silicon oxides, wherein the preparation process comprises the following steps by using the equipment claimed in claim 1:
   step 1, turning on the heating furnace;
   step 2, turning on the cooling device;
   step 3, opening the tank lid, mixing Si powder and $SiO_2$ powder as raw materials and placing them into the reaction unit, placing the collector into the collection unit, and closing the tank lid;
   step 4, subjecting the tank to a vacuum via the port;
   step 5, continuing to run the heating furnace and the cooling device after the completion of the reaction of the raw materials in the tank, opening the tank lid, taking out the collector, placing new raw materials into the reaction unit, placing a new collector into the collection unit, closing the tank lid, subjecting the tank to a vacuum via the port, starting a next reaction, and peeling off the silicon oxide product from the collector taken out of the collection unit; and
   step 6, repeating step 5 until the end of the preparation.

9. The process for preparing silicon oxides as claimed in claim 8, wherein the tank has a loading capacity of 2-200 KG; the heating furnace has a temperature of 1100-1400° C.; the tank has a vacuum degree of 0.1-10000 Pa; the cooling device has a temperature of 100-800° C.; and the period between placing a new collector in step 5 and taking out the collector in step 6 is from 2-60 h.

* * * * *

UNITED STATES PATENT AND TRADEMARK OFFICE
CERTIFICATE OF CORRECTION

PATENT NO. : 10,611,644 B2
APPLICATION NO. : 15/516363
DATED : April 7, 2020
INVENTOR(S) : Chunlei Pang et al.

Page 1 of 1

It is certified that error appears in the above-identified patent and that said Letters Patent is hereby corrected as shown below:

In the Claims

Claim 1, Column 5, Line 33 remove "to" after --with-- and before --a vacuum--

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*